United States Patent
Wadhwa et al.

(10) Patent No.: US 11,823,078 B2
(45) Date of Patent: Nov. 21, 2023

(54) CONNECTED INSIGHTS IN A BUSINESS INTELLIGENCE APPLICATION

(71) Applicant: International Business Machines Corporation, Armonk, NY (US)

(72) Inventors: Vinay Wadhwa, Ottawa (CA); Graham Wills, Naperville, IL (US); Valentin Balteanu, Ottawa (CA)

(73) Assignee: International Business Machines Corporation, Armonk, NY (US)

( * ) Notice: Subject to any disclaimer, the term of this patent is extended or adjusted under 35 U.S.C. 154(b) by 727 days.

(21) Appl. No.: 17/031,935

(22) Filed: Sep. 25, 2020

(65) Prior Publication Data

US 2022/0101154 A1    Mar. 31, 2022

(51) Int. Cl.
  *G06N 5/04*      (2023.01)
  *G06F 16/248*    (2019.01)
  *G06Q 30/0201*   (2023.01)

(52) U.S. Cl.
  CPC ............. *G06N 5/04* (2013.01); *G06F 16/248* (2019.01); *G06Q 30/0201* (2013.01)

(58) Field of Classification Search
  None
  See application file for complete search history.

(56) References Cited

U.S. PATENT DOCUMENTS

| | | |
|---|---|---|
| 6,995,768 B2 | 2/2006 | Jou |
| 11,579,760 B2 * | 2/2023 | Kim ...................... G06F 16/248 |
| 2015/0355817 A1 | 12/2015 | Dai |
| 2015/0356200 A1 | 12/2015 | Sanchez |
| 2016/0034305 A1 * | 2/2016 | Shear ..................... G06F 16/285 |
| | | 707/722 |
| 2018/0165843 A1 | 6/2018 | Broadbent |
| 2018/0299540 A1 * | 10/2018 | Cardno ................... G01S 13/75 |

(Continued)

OTHER PUBLICATIONS

"Summary of Data Changes in Business Analytic Applications", An IP.com Prior Art Database Technical Disclosure, Disclosed Anonymously, IP.com No. IPCOM000262475D, IP.com Electronic Publication Date: Jun. 4, 2020, 3 pages, <https://priorart.ip.com/IPCOM/000262475>.

(Continued)

*Primary Examiner* — Wilson Lee
(74) *Attorney, Agent, or Firm* — Edward P. Li (57) ABSTRACT

A computer-implemented method, a computer program product, and a computer system for determining and displaying connected insights based on a connection between data visualizations. A computer detects the second data visualization created on a coherent exploration path with the first data visualization. The computer determines, from first insights in first date frame for the first data visualization, top first insights that are interesting to the second data visualization. The computer determines, for respective ones of the top first insights, calculated fields representing states of data. The computer adds the calculated fields to a query to obtain a second data frame for the second data visualization. The computer determines second insights in the second data frame, where the second insights include data facts drawn from the connection between the first data visualization and the second data visualization. The computer displays the second insights along with the second data visualization.

18 Claims, 7 Drawing Sheets

(56) References Cited

U.S. PATENT DOCUMENTS

| | | | | |
|---|---|---|---|---|
| 2019/0347518 | A1* | 11/2019 | Shrestha | G06V 10/82 |
| 2020/0389495 | A1* | 12/2020 | Crabtree | G06F 16/2477 |
| 2021/0063410 | A1* | 3/2021 | Wilcox | G01N 33/6848 |
| 2021/0240921 | A1* | 8/2021 | Fry | G05B 19/4187 |
| 2021/0334908 | A1* | 10/2021 | Shu | G06Q 30/0201 |
| 2022/0277097 | A1* | 9/2022 | Cabot | H04W 12/02 |

OTHER PUBLICATIONS

"Generating Retrospective Visualizations on Real Time Streaming Data", An IP.com Prior Art Database Technical Disclosure, Disclosed Anonymously, IP.com No. IPCOM000226915D, IP.com Electronic Publication Date: Apr. 24, 2013, 8 pages, <https://priorart.ip.com/IPCOM/000226915>.

"SEMOSS—Creating Insights—Choosing Your Data—Part 1", SEMOSS Info, Oct. 27, 2018, 9 pages, <https://medium.com/@semossinfo/semoss-creating-insights-choosing-your-data-part-1-f8d8f3c9edf8>.

"View data insights on dashboard tiles with Power BI", The Power BI service for consumers, Sep. 24, 2020, 4 pages, <https://docs.microsoft.com/en-us/power-bi/consumer/end-user-insights>.

Mell et al., "The NIST Definition of Cloud Computing", National Institute of Standards and Technology, Special Publication 800-145, Sep. 2011, 7 pages.

Srinivasan, et al., Augmenting Visualizations with Interactive Data Facts to Facilitate Interpretation and Communication, Last printed Sep. 24, 2020, 10 pages, <https://arjun010.github.io/static/papers/voder-infovis18.pdf>.

* cited by examiner

CONNECTED INSIGHTS IN A BUSINESS INTELLIGENCE APPLICATION

BACKGROUND

The present invention relates generally to a business intelligence application, and more particularly to determining and displaying connected insights based on a connection between a first visualization and a second visualization.

Typically, when a user explores data using a business intelligence (BI) application, following steps happen: (1) The user creates a chart on a dataset. (2) The BI application finds and displays insights alongside the charts, for example, using natural-language generation. There may be many possible insights per chart, so that the BI application may choose a small number of important insights or may give a full list of insights which the user must search. (3) Based on information extracted from the chart and the insights, the user creates other charts, and the BI application processes insights for the other charts. This step is an iterative process. Basically, the user tries to discover important information about the data.

Currently, state-of-the-art BI applications process each chart separately and show insights based on naive guesses on which are important in charts; thus, insights for charts are disconnected from each other. As the space of potential insights grows with the maturing BI market and as the possible number of insights per chart grows from a dozen to hundreds or more, the current approach will become unsatisfactory. Users are left to figure out how to connect insights from each chart together to get a more complete picture and end up spending a lot of effort to hunt deeper for important information.

SUMMARY

In one aspect, a computer-implemented method for determining and displaying connected insights based on a connection between a first data visualization and a second data visualization is provided. The computer-implemented method includes detecting the second data visualization created on a coherent exploration path with the first data visualization. The computer-implemented method further includes determining, from first insights in first date frame for the first data visualization, top first insights that are interesting to the second data visualization. The computer-implemented method further includes determining, for respective ones of the top first insights, calculated fields representing states of data. The computer-implemented method further includes adding the calculated fields to a query to obtain a second data frame for the second data visualization. The computer-implemented method further includes determining second insights in the second data frame, where the second insights include data facts drawn from the connection between the first data visualization and the second data visualization. The computer-implemented method further includes displaying the second insights along with the second data visualization.

In another aspect, a computer program product for determining and displaying connected insights based on a connection between a first data visualization and a second data visualization is provided. The computer program product comprises a computer readable storage medium having program instructions embodied therewith, and the program instructions are executable by one or more processors. The program instructions are executable to detect the second data visualization created on a coherent exploration path with the first data visualization; determine, from first insights in first date frame for the first data visualization, top first insights that are interesting to the second data visualization; determine, for respective ones of the top first insights, calculated fields representing states of data; add the calculated fields to a query to obtain a second data frame for the second data visualization; determine second insights in the second data frame, where the second insights include data facts drawn from the connection between the first data visualization and the second data visualization; and display the second insights along with the second data visualization.

In yet another aspect, a computer system for determining and displaying connected insights based on a connection between a first data visualization and a second data visualization is provided. The computer system comprises one or more processors, one or more computer readable tangible storage devices, and program instructions stored on at least one of the one or more computer readable tangible storage devices for execution by at least one of the one or more processors. The program instructions are executable to detect the second data visualization created on a coherent exploration path with the first data visualization. The program instructions are further executable to determine, from first insights in first date frame for the first data visualization, top first insights that are interesting to the second data visualization. The program instructions are further executable to add the calculated fields to a query to obtain a second data frame for the second data visualization. The program instructions are further executable to determine second insights in the second data frame, where the second insights include data facts drawn from the connection between the first data visualization and the second data visualization. The program instructions are further executable to display the second insights along with the second data visualization.

DETAILED DESCRIPTION

With a disclosed method in the present invention, when a user moves from a first data visualization to a second data visualization as part of an exploration process, a business intelligence (BI) application takes key insights found from a data-frame for the first data visualization, and, in a data-frame for the second data visualization, labels data that is related to the key insights. As a result of augmenting the data-frame for the second visualization based on the insights from the first visualization, when analysis processes are run to get insights for the second visualization, the business intelligence (BI) application is able to capture connections between the first and second visualizations. When finding text of the insights, the user is able to view connections between previous insights (from the data-frame for the first data visualization) and newer insights (from the data-frame for the second data visualization).

Figure 1:
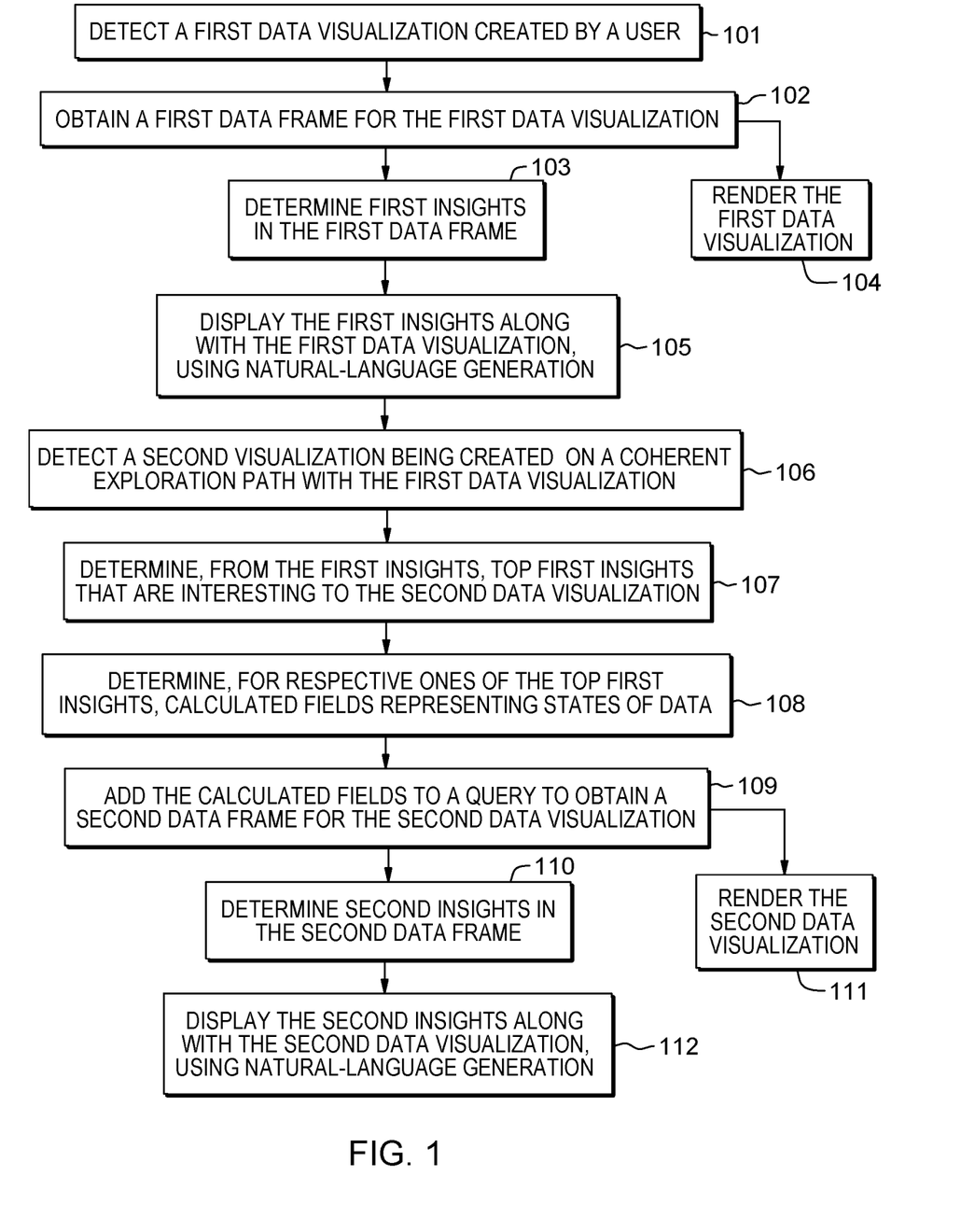
FIG. 1 is a flowchart showing operational steps of determining and displaying connected insights based on a connection between a first data visualization and a second data visualization, in accordance with one embodiment of the present invention.

FIG. 1 is a flowchart showing operational steps of determining and displaying connected insights based on a connection between a first data visualization and a second data visualization, in accordance with one embodiment of the present invention. The operational steps of determining and displaying connected insights are implemented by a business intelligence (BI) application on a computing device or server. The computing device or server is described in more detail in later paragraphs with reference to FIG. 5. In another embodiment, the operational steps may be implemented in a cloud computing environment. The cloud computing environment is described in later paragraphs with reference to FIG. 6 and FIG. 7.

At step 101, the BI application detects a first data visualization created by a user. The user works with the first data visualization by using the BI application. At step 102, the BI application obtains a first data frame for the first data visualization. The first data frame is being visualized by the user.

At step 103, the BI application determines first insights in the first data frame being visualized. The first insights are data facts around the first data frame and may be in a form of natural language text. The first insights include but not limited to outliers, information of time series or trends, correlation indicators, most frequent or least frequent category values, majority or minority category contributors, and statistical information (such as mean, maximum, and minimum) shown in the first data frame being visualized. After step 102, parallel to step 103, at step 104, the BI application renders the first data visualization. At step 105, the BI application displays the first insights along with the first data visualization, using natural-language generation.

After the first data visualization, the user starts another visualization (e.g., a next visualization in an exploration thread or another visualization on a dashboard). At step 106, the BI application detects a second visualization being created by the user on a coherent exploration path with the first data visualization. To determine whether the second data visualization is on the coherent exploration path, the BI application determines (1) whether the first data visualization and the second data visualization have some measures in common, (2) whether the second data visualization uses columns which drive or are correlated to other columns in the first data visualization, or (3) whether columns in both the first data visualization and the second data visualization drive or correlate with a common column.

At step 107, the BI application determines, from the first insights (determined at step 103), top first insights that are interesting to the second data visualization. The BI application uses an applicability algorithm to narrow down top n insights that can be interesting for the second data visualization. The applicability algorithm uses a set of rules to filter down to the following, for example: outliers, most frequent or least frequent category values, majority or minority category contributors, and time series flex points shown in the first data frame being visualized.

At step 108, for respective ones of the top first insights, the BI application determines calculated fields representing states of data. The calculated fields are added columns to a table based on expressions, and they are computed based on data already loaded. If expressions related to insights are satisfied, category values are entered in entries of a calculated field. For example, there is an insight "Sales in City A and City B are low" and this insight is about City A and City B in column "Location" to be outliers; the BI application may add a calculated field "IsOutlierLocation". In this example, if an entry of column "Location" is City A or City B, the BI application sets the value of a corresponding entry in the calculated field as 1; otherwise, the BI application sets the value of the calculated field as 0. As an example, a pseudo expression is as follows:

If (table.location='City A' or table.location='City B') then '1' else '0'

If the expression is satisfied, the entry in the calculated field is equal to 1; otherwise, the entry in the calculated field is equal to 0. In another example, for expressions related to "Income Ranges", entries of a calculated field may be category values of "High", "Medium", and "Low" based on satisfactions of the expressions. In yet another example, for expressions related to "Quarter of Year", entries of a calculated field may be category values of "Quarter 1", "Quarter 2", "Quarter 3", and "Quarter 4" based on satisfactions of the expressions.

At step 109, the BI application adds the calculated fields to a query to obtain a second data frame for the second data visualization. The second data frame includes data being visualized in the second visualization by the user and further includes the calculated fields added to the query.

At step 110, the BI application determines second insights in the second data frame. The second insights are data facts around the second data frame and may be in a form of natural language text. The BI application runs an analysis process to detect insights in the second data frame for the second data visualization, it may also detect patterns so confirm whether the data facts around the first data frame co-occur in the second data frame or whether there are new patterns, outliers, or anomalies. Similar to the first insights, the second insights include but not limited to outliers, information of time series or trends, correlation indicators, most frequent or least frequent category values, majority or minority category contributors, and statistical information (such as mean, maximum, and minimum) shown in the second data frame being visualized. After step 109, parallel to step 110, at step 111, the BI application renders the second data visualization. At step 112, the BI application displays the second insights along with the second data visualization, using natural-language generation.

In the paragraphs above, one embodiment of the present invention is described. In the embodiment, the first data visualization and the second data visualization are described in sequential steps, and the first insights and the second insights are also described in sequential steps. However, the method of determining and displaying connected insights based on a connection between the first data visualization and the second data visualization is not limited to the sequential steps. The method of determining and displaying connected insights is applicable to the first data visualization and the second data visualization or multiple visualizations simultaneously on a dashboard.

Figure 2:
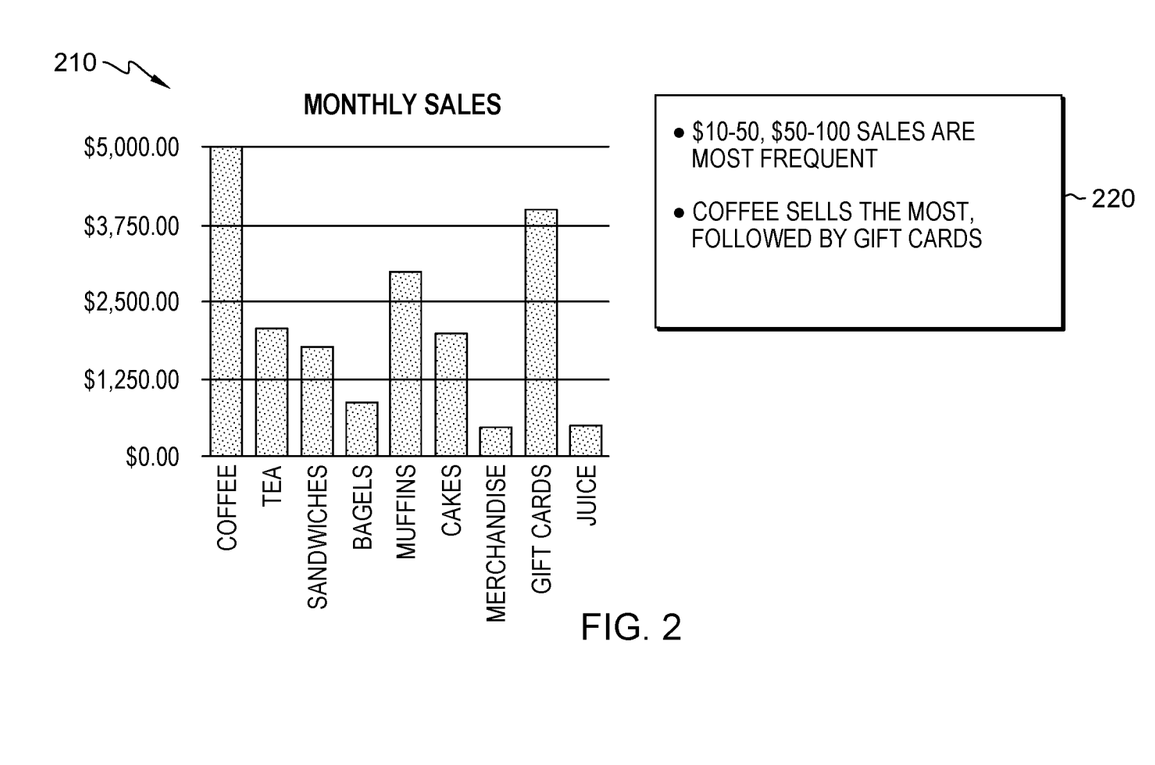
FIG. 2 presents an example illustrating the first data visualization and first insights determined from the first data visualization.

FIG. 2 presents an example illustrating a first data visualization 210 and first insights 220 determined from the first data visualization. The first data visualization 210 shows monthly sales of different products. The first insights 220 is displayed along with the first data visualization 210 and it provides data facts, such as "$10-50, $50-100 sales are most frequent" and "Coffee sells the most, followed by gift cards".

Figure 3:
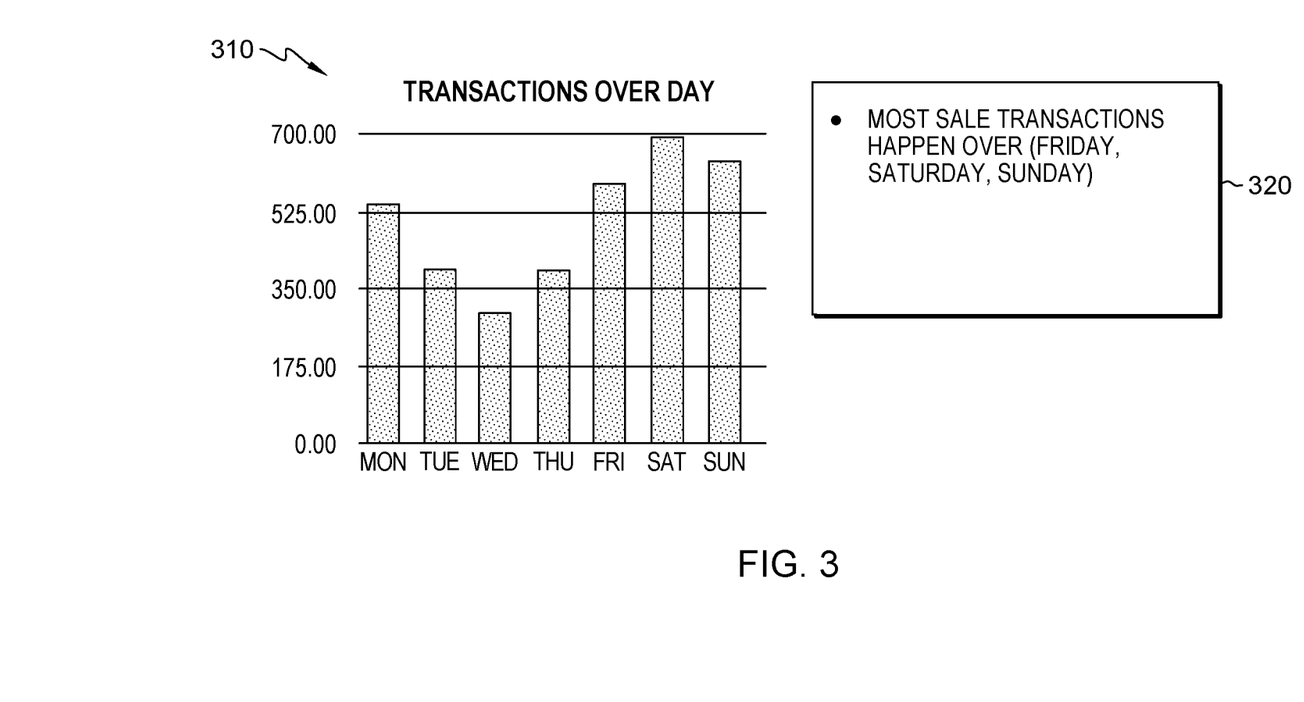
FIG. 3 presents an example illustrating the second data visualization and second insights determined from the second data visualization, without the present invention.

FIG. 3 presents an example illustrating a second data visualization 310 and second insights 320 determined from the second data visualization 310, without the present invention. When the user visualizes transactions over days in a week, the BI application displays the second data visualization 310. Without the method disclosed in the present invention, the BI application displays the second insights 320 and provides data facts related only to the second data visualization 310, such as "Most Sale transactions happen over (Friday, Saturday, Sunday)". The second insights 320 are only related to the second data visualization 310, and the second insights 320 is independent of the first data visualization 210 shown in FIG. 2, although the second data visualization 310 is created on a coherent exploration path with the first data visualization 210.

Figure 4:
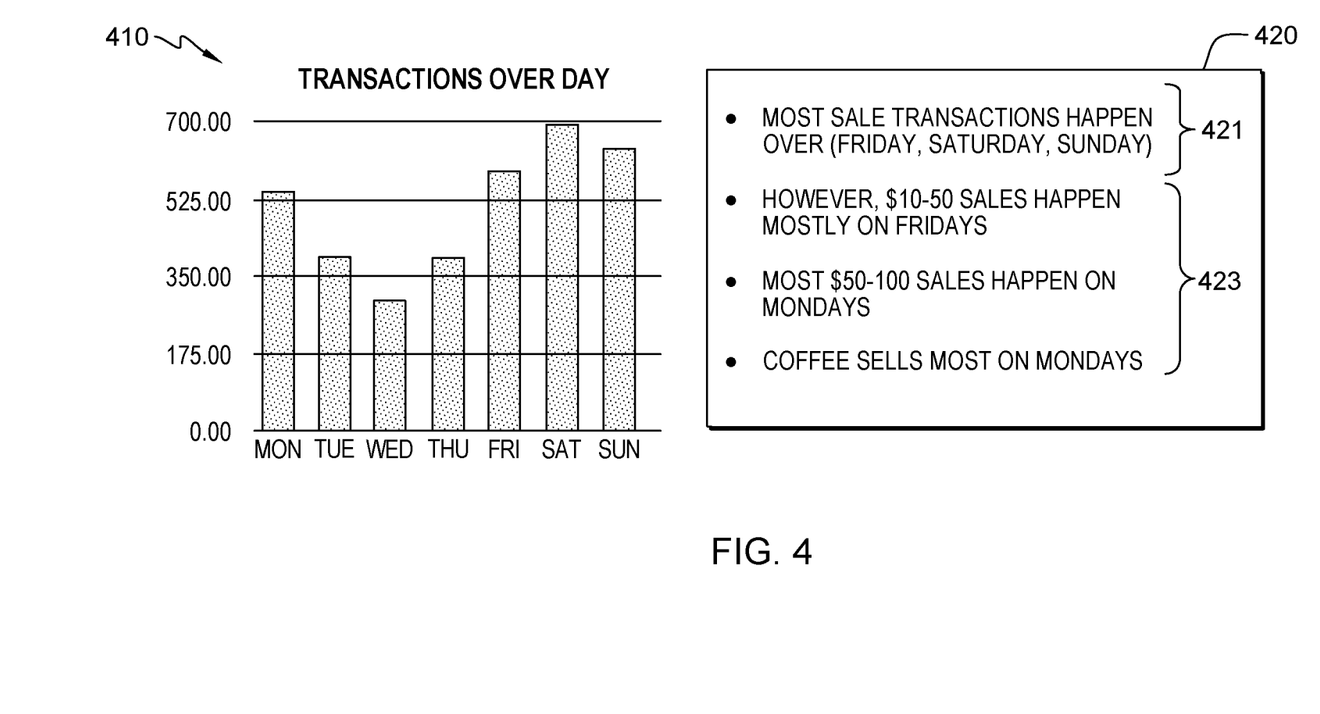
FIG. 4 presents an example illustrating the second data visualization and second insights based on a connection between a first data visualization and a second data visualization, in accordance with one embodiment of the present invention.

FIG. 4 presents an example illustrating a second data visualization 410 and second insights 420 based on a connection between the first data visualization 210 (shown in FIG. 2) and the second data visualization 410, in accordance with one embodiment of the present invention. When the user visualizes transactions over days in a week, the BI application displays the second data visualization 410. With the method disclosed in the present invention, the BI application displays the second insights 420. In displaying the second insights 420, the BI application displays insights 421 which provide data facts related only to the second data visualization 410; the insights 421 is the same as the second insights 320 shown in FIG. 3. Most importantly, with the method disclosed in the present invention, in displaying the second insights 420, the BI application also displays insights 423 which provide data facts drawn from the connection between the first data visualization 210 (shown in FIG. 2) and the second data visualization 410. For example, the BI application provides insights 423 as follows: "$10-50 Sales happen mostly on Fridays", "Most $50-100 sales happen on Mondays", and "Coffee sells most on Mondays".

Figure 5:
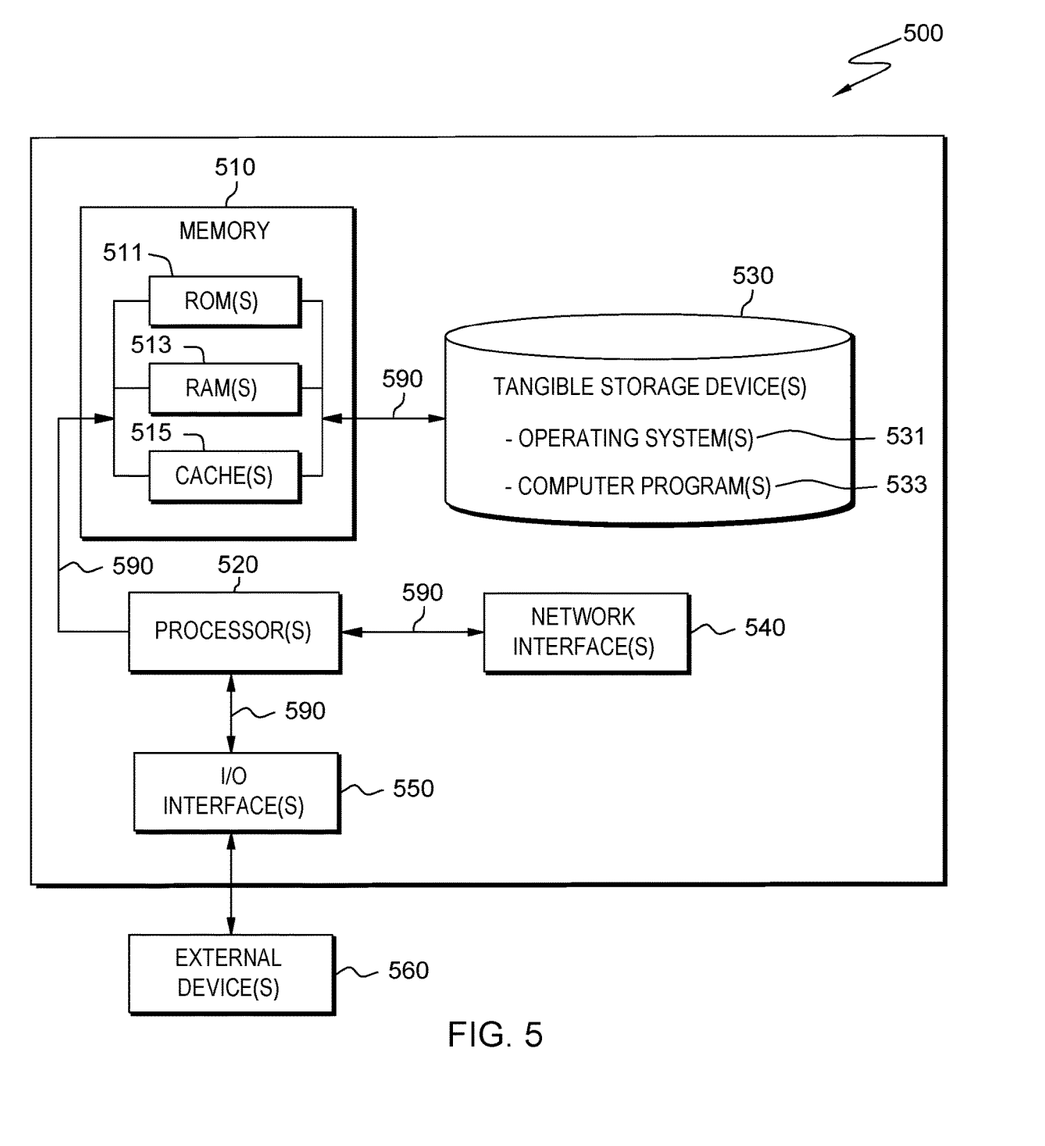
FIG. 5 is a diagram illustrating components of a computing device or server, in accordance with one embodiment of the present invention.

FIG. 5 is a diagram illustrating components of a computing device or server, in accordance with one embodiment of the present invention. It should be appreciated that FIG. 5 provides only an illustration of one implementation and does not imply any limitations with regard to the environment in which different embodiments may be implemented.

Referring to FIG. 5, computing device or server 500 includes processor(s) 520, memory 510, and tangible storage device(s) 530. In FIG. 5, communications among the above-mentioned components of computing device or server 500 are denoted by numeral 590. Memory 510 includes ROM(s) (Read Only Memory) 511, RAM(s) (Random Access Memory) 513, and cache(s) 515. One or more operating systems 531 and one or more computer programs 533 reside on one or more computer readable tangible storage device(s) 530.

Computing device or server 500 further includes I/O interface(s) 550. I/O interface(s) 550 allows for input and output of data with external device(s) 560 that may be connected to computing device or server 500. Computing device or server 500 further includes network interface(s) 540 for communications between computing device or server 500 and a computer network.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the C programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 6:
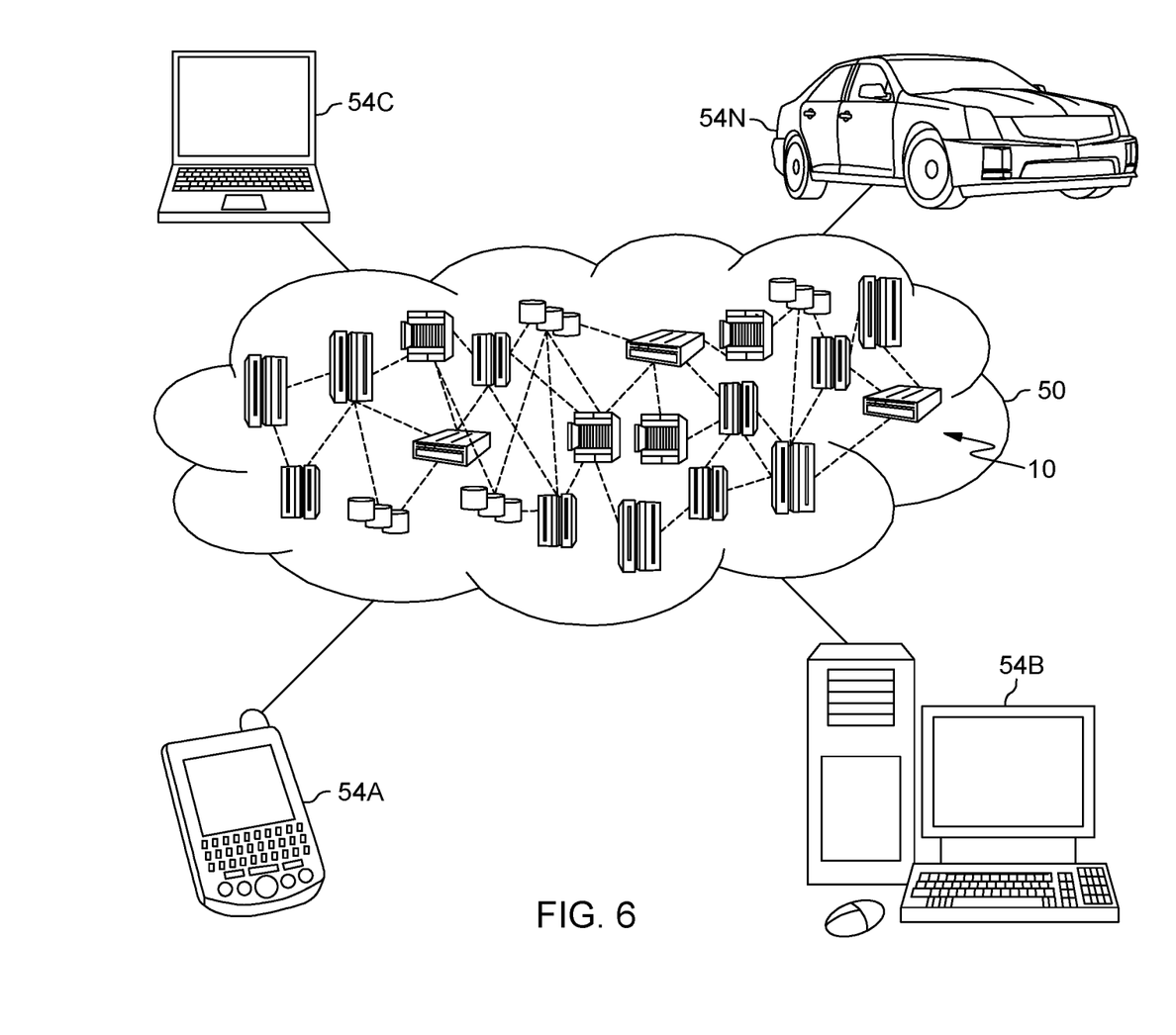
FIG. 6 depicts a cloud computing environment, in accordance with one embodiment of the present invention.

Referring now to FIG. 6, illustrative cloud computing environment 50 is depicted. As shown, cloud computing environment 50 includes one or more cloud computing nodes 10 with which local computing devices are used by cloud consumers, such as mobile device 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N are intended to be illustrative only and that computing nodes 10 and cloud computing environment 50 can communicate with any type of computerized device over any type of network and/or network addressable connection (e.g., using a web browser).

Figure 7:
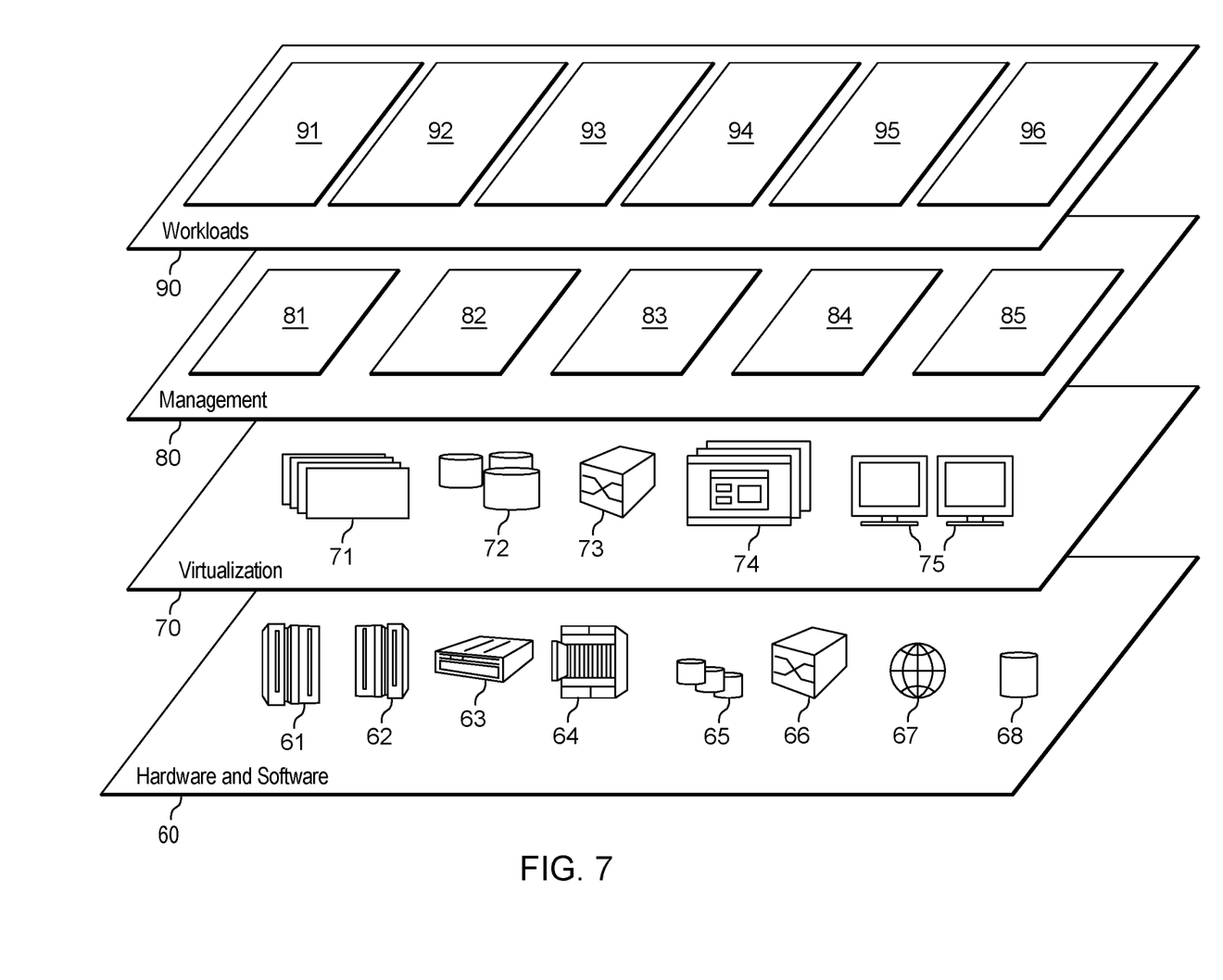
FIG. 7 depicts abstraction model layers in a cloud computing environment, in accordance with one embodiment of the present invention.

Referring now to FIG. 7, a set of functional abstraction layers provided by cloud computing environment 50 (FIG. 6) is shown. It should be understood in advance that the components, layers, and functions shown in FIG. 7 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and function 96. Function 96 in the present invention is the functionality of determining and displaying connected insights based on a connection between a first visualization and a second visualization.

What is claimed is:

1. A computer-implemented method for determining and displaying connected insights based on a connection between a first data visualization and a second data visualization, the method comprising:

detecting the second data visualization created on a coherent exploration path with the first data visualization;

determining, from first insights in first date frame for the first data visualization, top first insights that are interesting to the second data visualization;

determining, for respective ones of the top first insights, calculated fields representing states of data;

adding the calculated fields to a query to obtain a second data frame for the second data visualization;

determining second insights in the second data frame, the second insights including data facts drawn from the connection between the first data visualization and the second data visualization; and displaying the second insights along with the second data visualization.

2. The computer-implemented method of claim 1, further comprising:

detecting the first data visualization;

obtaining the first data frame for the first data visualization;

determining the first insights in the first data frame; and displaying the first insights along with the first data visualization.

3. The computer-implemented method of claim 1, wherein the first data visualization and the second data visualization are displayed by using natural-language generation.

4. The computer-implemented method of claim 1, further comprising:

determining whether the second data visualization is on the coherent exploration path with the first data visualization.

5. The computer-implemented method of claim 1, wherein the calculated fields are columns added to a table based on expressions and the calculated fields are computed based on data already loaded.

6. The computer-implemented method of claim 5, wherein, if the expressions are satisfied, category values are entered in entries of a calculated field.

7. A computer program product for determining and displaying connected insights based on a connection between a first data visualization and a second data visualization, the computer program product comprising a computer readable storage medium having program instructions embodied therewith, the program instructions executable by one or more processors, the program instructions executable to:
- detect the second data visualization created on a coherent exploration path with the first data visualization;
- determine, from first insights in first date frame for the first data visualization, top first insights that are interesting to the second data visualization;
- determine, for respective ones of the top first insights, calculated fields representing states of data;
- add the calculated fields to a query to obtain a second data frame for the second data visualization;
- determine second insights in the second data frame, the second insights including data facts drawn from the connection between the first data visualization and the second data visualization; and
- display the second insights along with the second data visualization.

8. The computer program product of claim 7, further comprising the program instructions executable to:
- detect the first data visualization;
- obtain the first data frame for the first data visualization;
- determine the first insights in the first data frame; and
- display the first insights along with the first data visualization.

9. The computer program product of claim 7, wherein the first data visualization and the second data visualization are displayed by using natural-language generation.

10. The computer program product of claim 7, further comprising the program instructions executable to:
- determine whether the second data visualization is on the coherent exploration path with the first data visualization.

11. The computer program product of claim 7, wherein the calculated fields are columns added to a table based on expressions and the calculated fields are computed based on data already loaded.

12. The computer program product of claim 11, wherein, if the expressions are satisfied, category values are entered in entries of a calculated field.

13. A computer system for determining and displaying connected insights based on a connection between a first data visualization and a second data visualization, the computer system comprising one or more processors, one or more computer readable tangible storage devices, and program instructions stored on at least one of the one or more computer readable tangible storage devices for execution by at least one of the one or more processors, the program instructions executable to:
- detect the second data visualization created on a coherent exploration path with the first data visualization;
- determine, from first insights in first date frame for the first data visualization, top first insights that are interesting to the second data visualization;
- determine, for respective ones of the top first insights, calculated fields representing states of data;
- add the calculated fields to a query to obtain a second data frame for the second data visualization;
- determine second insights in the second data frame, the second insights including data facts drawn from the connection between the first data visualization and the second data visualization; and
- display the second insights along with the second data visualization.

14. The computer system of claim 13, further comprising the program instructions executable to:
- detect the first data visualization;
- obtain the first data frame for the first data visualization;
- determine the first insights in the first data frame; and
- display the first insights along with the first data visualization.

15. The computer system of claim 13, wherein the first data visualization and the second data visualization are displayed by using natural-language generation.

16. The computer system of claim 13, further comprising the program instructions executable to:
- determine whether the second data visualization is on the coherent exploration path with the first data visualization.

17. The computer system of claim 13, wherein the calculated fields are columns added to a table based on expressions and the calculated fields are computed based on data already loaded.

18. The computer system of claim 17, wherein, if the expressions are satisfied, category values are entered in entries of a calculated field.

* * * * *